Jan. 12, 1943.      A. A. ANDRAKE      2,308,344
METHOD OF MAKING AIRPLANE PROPELLERS
Filed March 25, 1939      3 Sheets-Sheet 1
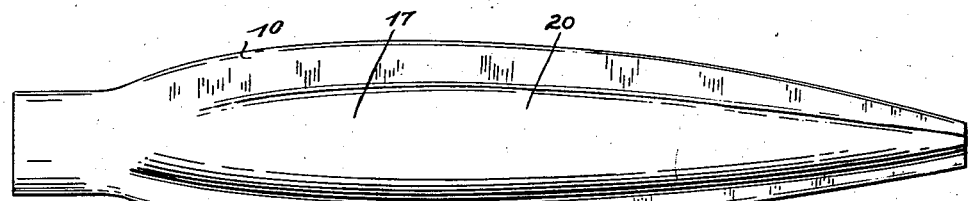
FIG. 1
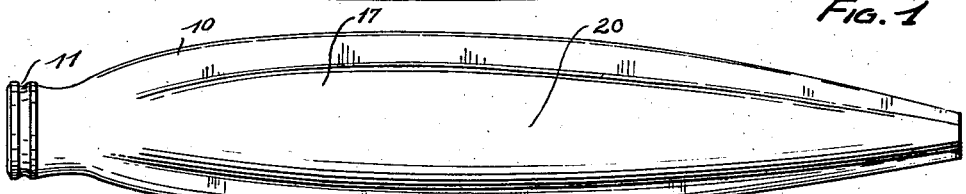
FIG. 2
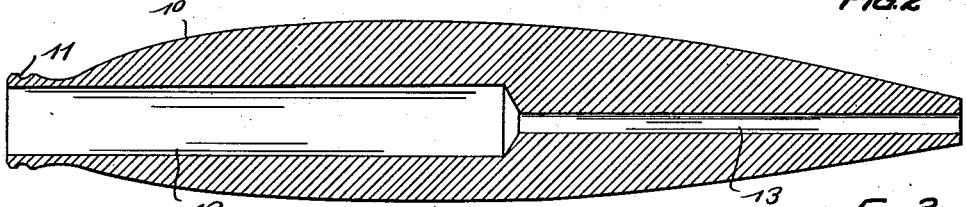
FIG. 3
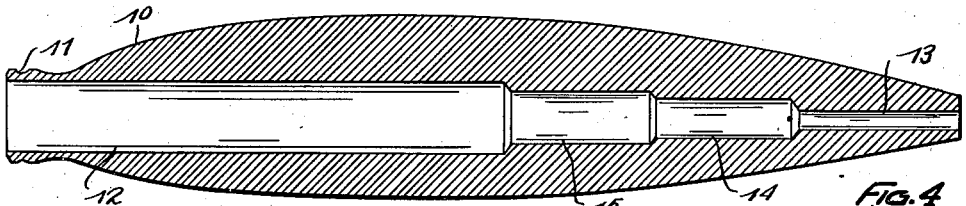
FIG. 4
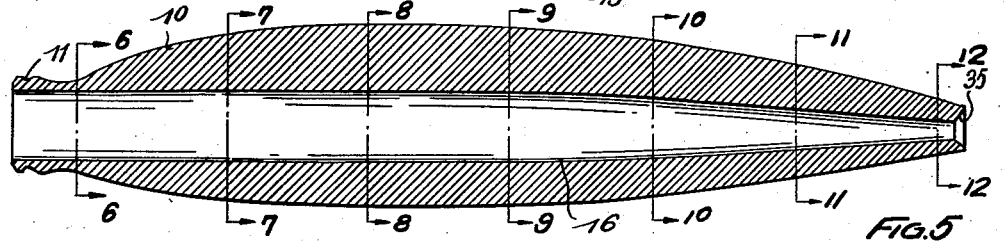
FIG. 5
 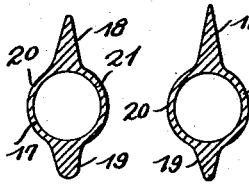  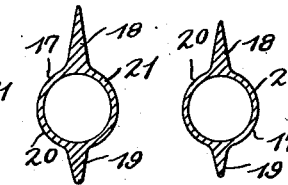 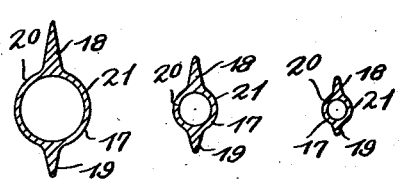 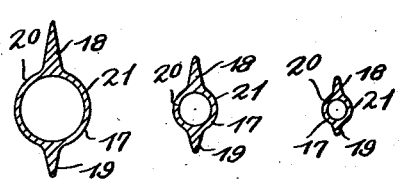 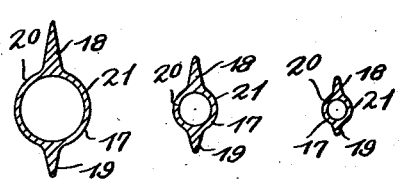
FIG. 6   FIG. 7   FIG. 8   FIG. 9   FIG. 10   FIG. 11   FIG. 12
INVENTOR.
ANDREW A. ANDRAKE
BY
ATTORNEYS

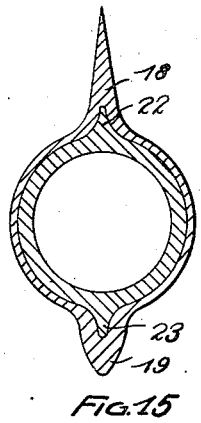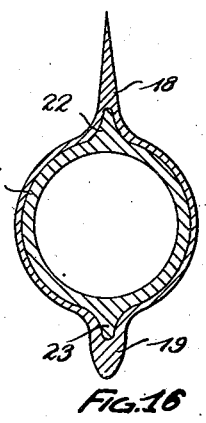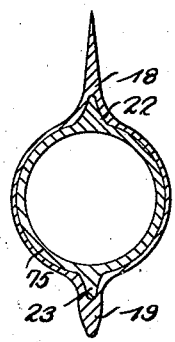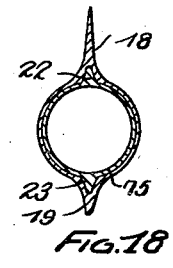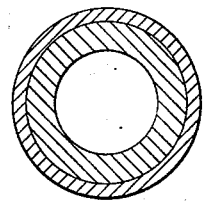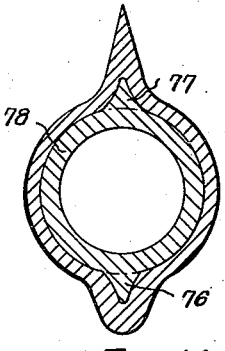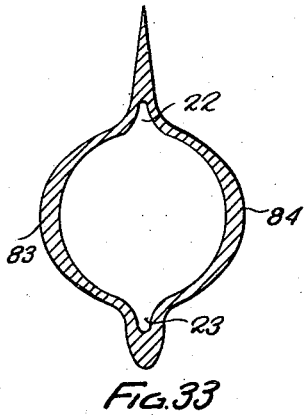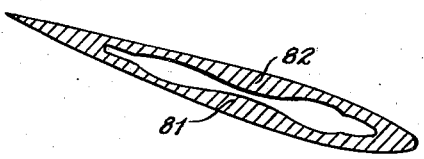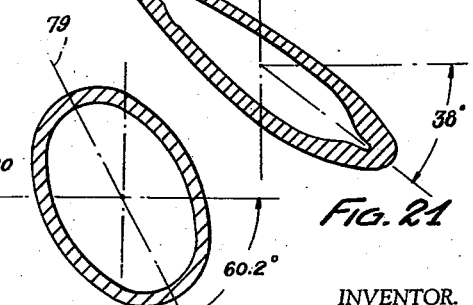
INVENTOR.
ANDREW A. ANDRAKE
ATTORNEYS Jan. 12, 1943.  A. A. ANDRAKE  2,308,344
METHOD OF MAKING AIRPLANE PROPELLERS
Filed March 25, 1939  3 Sheets-Sheet 3
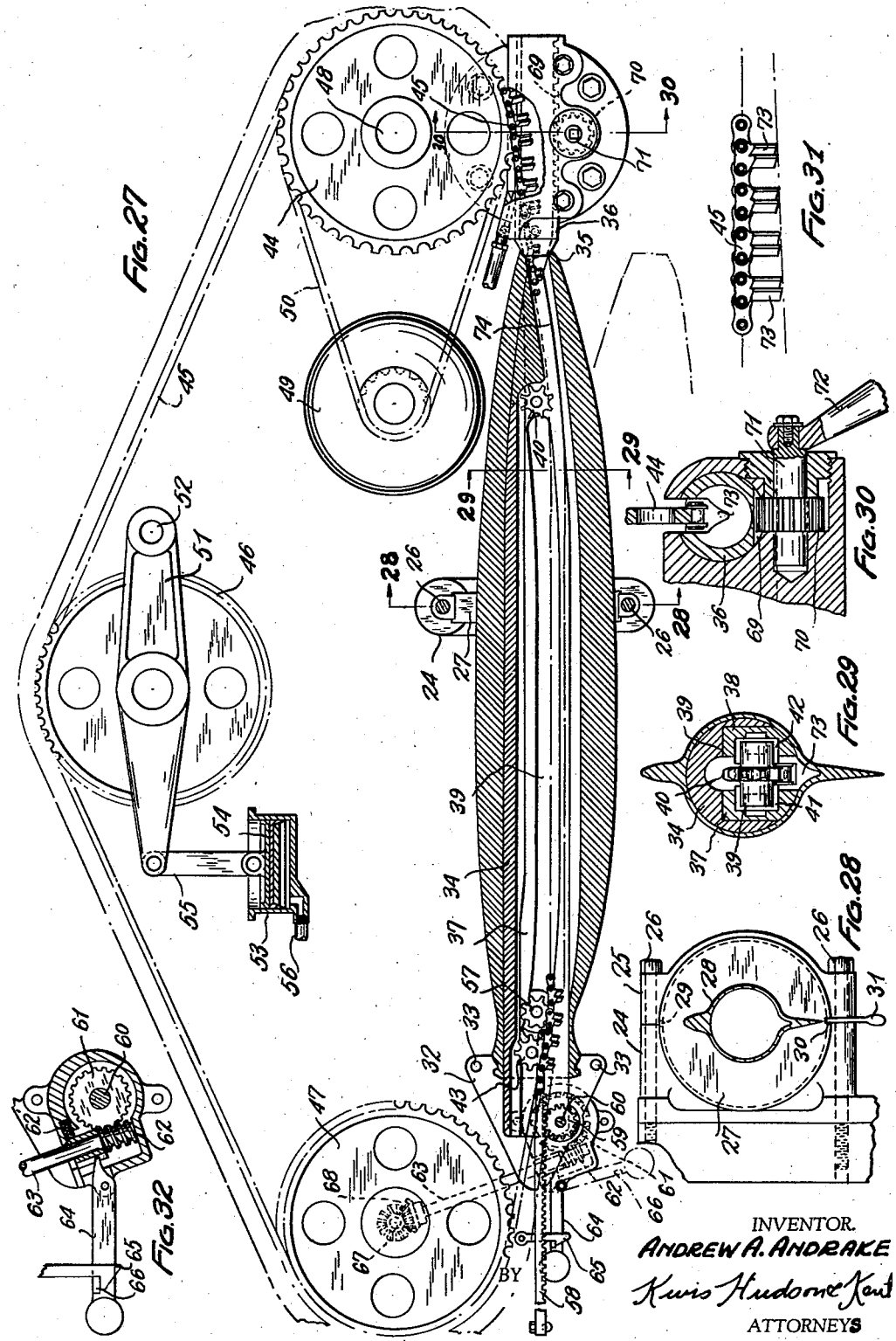
INVENTOR.
ANDREW A. ANDRAKE
BY
Kuris Hudome Kent
ATTORNEYS Patented Jan. 12, 1943

2,308,344

UNITED STATES PATENT OFFICE 2,308,344

METHOD OF MAKING AIRPLANE PROPELLERS

Andrew A. Andrake, Williamsport, Pa.

Application March 25, 1939, Serial No. 264,161

8 Claims. (Cl. 29—156.8)

This invention relates to hollow propeller blades especially adapted for use in airplanes, and more particularly to an improved method of manufacturing the same.

It is one of the objects of the invention to provide an improved method of manufacturing hollow propeller blades that is adapted to produce uniformly and at lower cost than previous methods, blades having the requisite qualities as to strength and durability and that will also have predetermined desirable aerodynamic characteristics.

It is a further object of the invention to provide a method of manufacturing hollow propeller blades that will be adapted for manufacturing such blades from steel alloys, also aluminum and aluminum alloys, magnesium and magnesium alloys, stainless steel, Monel metal or copper beryllium alloy. The choice of the materials to be used will be made to suit the conditions of operation that the propeller will be subjected to.

To meet the requirements of modern aircraft, weight is a vital consideration and must, of necessity, be as low as practicable without sacrificing any of the qualities or characteristics that are necessary to enable the blade to withstand the combined bending, centrifugal and vibration stresses that will be imposed upon it in service.

Propeller blades heretofore used have possessed many undesirable aerodynamic and structural characteristics and the methods used in manufacturing have been subject to certain limitations with respect to reducing the weight to the minimum, obtaining the best aerodynamic characteristics, and uncontrollable factors in manufacturing processes which have resulted in lack of uniformity of product and relatively high costs.

By my improved method of manufacturing hollow propeller blades I am able to produce blades of minimum weight, high aerodynamic efficiency and uniformity in a construction which is not only hollow, but substantially without seams or welds, from a one-piece forged blank, the method of construction meeting the exacting requirements of present day air craft service.

In addition to the above mentioned objects of my invention, there are other objects and features of novelty that will be apparent from the following description, taken in connection with the accompanying drawings which illustrate what I now consider to be the preferred method of practicing my invention.

In the drawings,

Fig. 1 is a plan view of a forged blank from which the finished blade is produced.

Fig. 2 is a view similar to Fig. 1 but showing the blank after the first operation in which the hub or root of the blade is roughly machined on the exterior.

Fig. 3 is a longitudinal section of the blade, as illustrated in Fig. 1 and showing the first operations for boring out the interior to provide a hollow blank for the subsequent operations.

Fig. 4 is a view similar to Fig. 3 but illustrating further steps in forming the hollow blank.

Fig. 5 is similar to Fig. 4 but shows the blank after the interior thereof has been reamed out for the purpose of finishing the longitudinal opening through the blank.

Figs. 6 to 12, inclusive, are transverse sections through the blank, as illustrated in Fig. 5, the sections being taken respectively at the stations indicated by the lines 6—6, 7—7, 8—8, 9—9, 10—10, 11—11 and 12—12.

Figs. 13 to 19, inclusive, are transverse sections, corresponding, respectively, to the sections of Figs. 6 to 12, inclusive, but illustrating the blade after the exterior thereof has been machined to provide the desired wall thickness throughout various parts of the blade and after the bore has been provided with lateral substantially V-shaped extensions into the fins and after the soft metal mandrel has been inserted, these sections being on a substantially larger scale than the sections as illustrated in Figs. 6 to 12 inclusive.

Figs. 20 to 26 inclusive are transverse sections of the blade corresponding respectively to the sections of Figs. 15 to 19, inclusive, and showing the blade after the flattening operation and in its finished form.

Fig. 27 is a composite view of an apparatus illustrating a method for cutting the lateral extensions of the bore of the blank certain parts of the apparatus being shown in elevation and other parts in section and the blank being also shown in longitudinal section.

Fig. 28 is a section on the line 28—28 of Fig. 27.

Fig. 29 is a section on the line 29—29 of Fig. 27.

Fig. 30 is a section on the line 30—30 of Fig. 27.

Fig. 31 is an elevation of a portion of the chain of cutters for cutting the lateral extensions of the bore of the blank.

Fig. 32 is an enlarged detail section showing a part of the feed mechanism.

Fig. 33 is a transverse section of the blade corresponding to Fig. 16 but illustrating a modification, and Fig. 34 is a section corresponding to Fig. 23 but illustrating the effect of the modification shown in Fig. 33 on the completed blade.

Referring to the drawings, Fig. 1 illustrates a solid forged blank 10 of steel or other material. Fig. 2 indicates the same blank after the hub or root of the blade has been externally machined as indicated at 11 to roughly approximate the formation of the finished blade at this point. The blank is then drilled or bored to provide the relatively large central opening 12 which extends approximately to the station represented by the line 9—9 in Fig. 5, and a smaller hole 13 is then drilled from the bore 12 to the tip end of the blade. Since the finished bore of the blank is of tapering form from the station 9—9 to the tip end of the blade a drill substantially of the diameter of the finished bore at the station 11—11 is then run into the blank to enlarge the hole 13, as indicated at 14, and then a drill substantially of the same diameter as the finished bore at the station 10—10 is run into the blank to enlarge the hole 14, as indicated at 15. While I have illustrated the rough boring of the blank, from the station 9—9 to the tip end as comprising the three stages 13, 14 and 15, it will be understood that this number of stages may be increased as desired so long as no point of the rough bore exceeds the diameter of the finished bore at that point.

The next operation consists in reaming out the bore of the blank by means of a reamer of suitable shape to provide the finished bore 16 as illustrated in Fig. 5.

For the purpose of subsequent operations the blank, as illustrated in Fig. 5 will be considered as the blank employed in my novel method of manufacturing a propeller blade, because, while I prefer to produce the blank, as illustrated in Fig. 5, in the manner above described, it will be apparent that this blank may also be made in other ways as, for example, by a hollow forging operation.

Figs. 6 to 12 inclusive illustrate the shape of the various cross-sections of the blank and these sections may be variously defined as consisting of a central circular section 17 of varying external diameter at the different stations, with fins 18 and 19 projecting from opposite sides of the body section of the airfoil portion, or the sections may be considered as consisting of a substantially flat oval portion comprising the fins 18 and 19 with the substantially central longitudinally extending ribs 20 and 21 thereon.

The next operation is to provide the substantially V-shaped extensions or grooves 22 and 23 of the bore, these extensions being formed by removal of some of the metal in the interior of the fins. These extensions 22 and 23 may be formed by the apparatus illustrated in Figs. 27 to 31 inclusive. This apparatus comprises a suitable base (not shown) on which there is mounted a support comprising the members 24 and 25 which may be clamped together by the bolts 26. Within this support is a ring 27 which is rotatable in the support and provided with an opening 28 conforming to and adapted to fit the exterior of the blank as shown in Figs. 27 and 28. On opposite sides of the ring 27 there are notches 29 and 30 with which a latch 31 is adapted to cooperate for the purpose of enabling the blank to be properly indexed and positioned for the broaching operation about to be described. The root end of the blade is secured in a support 32 which may also be in the form of a two-part clamp, the parts of which are secured together by bolts 33. Before the blank is placed in the apparatus a specially shaped mandrel 34, which accurately fits the bore of the blank, is positioned therein as shown in Fig. 27. The bore at the tip end is reamed to provide a conical seat 35 which receives the member 36, the latter acting as a support for the tip end of the blade. The mandrel comprises the track bars 37 and 38, these bars being provided with longitudinally extending grooves 39 which are shaped to conform to the varying depth of the grooves 22 and 23 that are to be formed in the blank. A sprocket wheel 40 is rotatably supported in shoes 41 and 42 which are mounted in the track bars 37 and 38 so as to position the sprocket wheel 40, as shown in Fig. 27. In a similar manner a sprocket 43 is arranged adjacent the root end of the blank, the sprockets 40 and 43 serving as idlers to guide the chain of broaching cutters hereinafter described.

A driving sprocket 44 is suitably supported on the frame or base of the machine and an endless chain 45 passes around this sprocket, over an idler sprocket 46 and an idler sprocket 47 adjacent the root end of the blade. As will be seen from Fig. 27, the chain 45 passes from the sprocket 47 through the blank and over the idlers 43 and 40, and thence to the sprocket 44. The latter sprocket will be suitably mounted on a shaft 48 which may be driven from a motor 49 by means of a belt and suitable pulleys, or in any other preferred manner. The sprocket 46 is a tensioning sprocket for the chain 45 and is carried by a lever 51 that is supported on a relatively fixed fulcrum 52, about which the lever 51 is adapted to swing for the purpose of either tightening or loosening the chain 45 as will be obvious. Any suitable mechanism may be used for moving the lever 51 and, for this purpose, I have illustrated a cylinder 53 having a piston 54 therein which is connected with the lever by a link 55. Pressure fluid may be admitted to the underside of the piston 54, by means of a supply pipe 56 that will be controlled by a suitable valve, as will be readily understood by those skilled in the art, so that the piston 54 may be positioned as desired to give the proper tension to the chain 45.

A guiding sprocket 57 is supported on a carriage which is adapted to move in the grooves 39 in the track bars 37 and 38. A rack 58 is connected with the carriage of the sprocket 57 and a pinion 59 normally meshes with the rack 58. The pinion 59 is carried by a shaft 60 that is mounted in a housing, and on this shaft there is a worm gear 61 with which a worm 62 on the shaft 63 is adapted to engage. As shown in Fig. 32, the worm 62 is in mesh with the worm gear 61 and is held in this position by the cam lever 64 which is supported in the position shown in full lines by means of a latch 65. When the latch 65 is disengaged from the lever 64 the latter drops to the dotted line position indicated at 66 in Fig. 27 and this permits the spring 62' to move the worm 62 out of mesh with the worm gear 61, thereby stopping the feed. The shaft 63 is driven from the shaft 67, on which the sprocket 47 is mounted, by means of a pair of bevel gears 68.

The member 36 is provided with rack teeth 69 with which a pinion 70 cooperates. This pinion is mounted on a shaft 71 that may be rotated by means of a handle 72 to slide the member 36 back and forth into and out of engagement with the seat 35 in the tip end of the blank.

As shown in Fig. 31, the cutters 73 are arranged in a series of gradually increasing length. All of the cutters conform to the same profile, so that the variations in the size of the grooves 22 and 23 at the different stations throughout the length of the blade will be determined by the depth to which the cutters penetrate.

In the operation of the broaching apparatus, assuming that the cutter chain 45 is moving through the blank from left to right, the cutting operation is started by having the worm 62 out of engagement with its gear so that there will be no feeding of the carriage on which the sprocket 47 is mounted. Adjacent the tip end of the blank the chain 45 is guided by the surface 74 in the mandrel so that by the time the chain has made one complete circuit starting with the shortest cutter at the tip end of the blank that portion of the groove 22 which is opposite the surface 74 will be broached to its finished dimensions and, during this operation it will be noted that the cutter chain will extend directly across from the sprocket 40 to the sprocket 57. After the completion of the groove 23 at the tip end of the blade the lever 64 is swung from the dotted line position to the full line position and secured in the latter position by means of the latch 65. This will cause the worm 62 to engage with the worm gear 61 and start the feeding operation of the carriage for the sprocket 57. As this carriage moves to the right, very slowly, through the grooves 39, the shape of the latter, as will be seen from Fig. 27, will carry the sprocket 57 downward and thus the cutters on the chain will be forced downwardly and broach the groove 22 to the desired depth from one end of the blade to the other.

After the groove 23 has been broached, as above described, the clamps for the blank are loosened and the blank is rotated 180° or until the latch 31 engages with the notch 29 and the operation may then be repeated to form the groove 22.

The blank will then be removed from the broaching apparatus and the bore of the blank will be carefully smoothed throughout its length to remove all tool marks, this being done by an emery belt or in any other suitable manner.

The external surfaces of the blank will then be accurately machined by a profile miller controlled by a master cam of the required contour, this operation being similar to the method commonly used for making dies for automobile bodies by means of a profile miller and is well known to those skilled in the art. The external surface of the blank is then carefully polished to remove all tool marks and the blank will then be finished to the extent that all sections will be accurately formed to the desired thickness and it will be noted from the drawings that the thicknesses at the various stations throughout the length of the blank vary in accordance with the structural requirements from the standpoint of providing proper strength at all points and also proper aerodynamic characteristics.

A soft metal mandrel is then placed in the bore of the blank. This mandrel may be of lead or any other suitable material and may be placed in the blank by casting around a suitably proportioned core so as to fill the various sections as shown at 75 in Fig. 16. The cross-sectional area of the soft mandrel, at any section, is so calculated as to be slightly more than the area of the opening in the complete blade at that section. In other words, the cross-sectional area of the soft metal mandrel, as shown in Fig. 16, would be substantially the same as the opening in the section as shown in Fig. 23 which is at the same station as the section illustrated in Fig. 16.

Another way of inserting the soft metal mandrel is indicated in Fig. 14, wherein soft metal strips such as 76 and 77 are first inserted in the grooves and then a preformed tubular soft metal mandrel 78 is inserted.

The next operation is to flatten the blank so as to change the cross-sections at the different stations, represented by Figs. 13 to 19 inclusive to the cross-sections shown in Figs. 20 to 26 inclusive, in which the cross-section of the finished blade at these stations is illustrated. This operation may be performed by means of suitable dies in a hydraulic press or like mechanism, or the blank may be rolled or hammered into shape, the soft metal mandrel supporting the walls that are to be flattened and, because the mandrel has been carefully proportioned so as to fill the opening in the blade, at the conclusion of the flattening operation, the final steps of the flattening operation are performed on substantially solid metal because of the presence of the soft metal mandrel which in the flattening operation is deformed along with the deformation of the walls of the blade itself. It will be noted that the grooves 22 and 23 extend beyond what would be the central cylindrical section 17 if the fins 18 and 19 were omitted. Because of this construction the fins are not materially changed in the flattening operation but the bending takes place substantially entirely in the comparatively thin wall portions of the blank. This avoids the setting of undesirable strains adjacent to the place where the walls of the tubular portion join the fins.

The next operation is to twist the blade at each station, throughout its length, until the required angles to a predetermined plane are provided. For example, referring to Fig. 20, in a particular design the angle of the axis 79 to the plane 80 may be 60.2°. In a similar manner, referring to Fig. 21, the angle of the twist at the station represented by this section may be 38° and so on to the section illustrated in Fig. 26, wherein the angle of twist is 12°.

This final step of twisting the blade, as above described, may be eliminated by putting the required twist in the original blank by means of dies that are properly shaped for that purpose.

The soft metal core may then be removed by heating the blade sufficiently to melt the metal of the core. The external surface at the root of the blade may then be finish machined and the blade is then ready to be polished, balanced and plated.

If the material of which the blade is made is of such a nature as to make heat treatment desirable after the completion of the forming operations, this can be done by heating the blade in a neutral atmosphere to the required heat treating temperature and then placing it in suitable quenching dies for retaining its shape. The quenching fluid may be injected into the interior of the blade and sufficient pressure exerted to force all portions of the blade outwardly against the die surfaces.

In the completed blade the extreme tip end may be finished by welding the short seam at this point or by riveting the sides together or the sides may be left in a close butted arrangement.

Referring to Figs. 33 and 34 it will be noted that provision is made for forming the blade with longitudinal reenforcing ribs 81 and 82. Comparing Fig. 33 with Fig. 16 it will be seen that the central portion of the blank between the fins is substantially cylindrical and that the inner and outer contours of this central portion are in the form of substantially concentric circles thereby providing uniform wall thickness, whereas in Fig. 33 the external contour of this central portion is in the form of an oval which has the effect of thickening the walls as shown at the points 83 and 84. In the flattening operation above described the thickened portions 83 and 84 form the ribs 81 and 82 on the interior of the blade.

The phrases "airfoil portion," "width," "length," "thickness," "root portion," "leading edge" and "trailing edge" used throughout the specification including the claims, designates portions and dimensions with respect to the finished propeller blade.

Having thus described my invention, I claim:

1. The method of forming a hollow propeller blade for airplanes and the like which comprises: forging a blank having a root portion and an airfoil portion including a substantially cylindrical body section of varying transverse cross section and external integral fins on opposite sides thereof, said airfoil portion being wider than the finished blade in a direction generally normal to the planes of said fins and being narrower than the finished blade in the general direction of the planes of said fins; forming a longitudinally extending aperture of varying diameter in the interior of said blank, said aperture opening into one end of the blank; forming longitudinally extending grooves of varying depth in the interior of said blank, said grooves extending beyond said body section and into said fins; placing a mandrel of low melting point yieldable material in the aperture in said blank, the volume of the material in said mandrel being substantially that of the aperture in the finished blade; finishing the exterior of said fins to substantially the form of the leading and trailing portions of the finished propeller and the remainder of the airfoil portion to a form such that when it is flattened in a direction generally normal to the planes of the fins the exterior surface thereof will form smooth plain curves connecting the exterior surfaces of the fins; flattening said body section in a direction generally normal to the planes of said fins without substantially bending the wall section thereof immediately adjacent to the solid portion of said fins and twisting the same until it is brought into the contour of the finished blade; and heating said blank to remove said mandrel.

2. The method of forming a hollow propeller blade for airplanes and the like which comprises: forging a blank having a root portion and an airfoil portion including a body section of varying transverse cross section and external integral fins on opposite sides thereof, said airfoil portion being wider than the finished blade in a direction generally normal to the planes of said fins and being narrower than the finished blade in the general direction of the planes of said fins; forming a longitudinally extending aperture of varying diameter in the interior of said blank, said aperture opening into one end of said blank; forming longitudinally extending grooves of varying depth in the interior of said blank, said grooves extending beyond said body section and into said fins; finishing the exterior of the fins to substantially the form of the leading and trailing portions of the finished propeller and the body section to a form such that when it is flattened in a direction generally normal to the planes of the fins the exterior surface thereof will form smooth plain curves connecting the exterior surfaces of the fins; positioning a mandrel of low melting point yieldable material in the aperture in said blank, the volume of the material in said mandrel being substantially that of the aperture in the finished blade; flattening said body section in a direction generally normal to the planes of the fins without substantially bending the wall section thereof immediately adjacent to the solid portion of said fins until the exterior surface thereof forms smooth plain curves with the exterior surfaces of the fins; heating said blank to remove said mandrel and twisting the airfoil portion to bring it into the shape of the finished blade.

3. The method of forming a hollow propeller blade for airplanes and the like which comprises: forging a blank having a root portion and an airfoil portion including a body section of varying transverse cross section and external integral fins on opposite sides thereof, said airfoil portion being wider than the finished blade in a direction generally normal to the planes of said fins and being narrower than the finished blade in the general direction of the planes of said fins; machining the interior of said blank to form a longitudinally extending aperture of varying diameter opening into one end; machining longitudinal grooves of varying depth in the interior of said blank, said grooves extending beyond said body portion and into said fins; positioning a mandrel of low melting point yieldable material in the aperture in said blank, the volume of material in said mandrel being substantially that of the aperture in the finished blade; finishing the exterior of the fins to substantially the form of the leading and trailing portions of the finished propeller and the body section to a form such that when it is flattened in a direction generally normal to the planes of said fins the exterior surface thereof will form smooth plain curves connecting the exterior surfaces of the fins; flattening said body section in a direction generally normal to the planes of the fins without substantially bending the wall section thereof immediately adjacent to the solid portion of said fins until the exterior surface thereof forms smooth plain curves with the exterior surfaces of the fins; heating said blank to remove said mandrel; and twisting the airfoil portion to bring it into the shape of the finished blade.

4. The method of forming a hollow propeller blade for airplanes and the like which comprises: forging a blank having a root portion and an airfoil portion including a body section, said body section being of generally cylindrical shape and of varying transverse cross section and having on opposite sides thereof external integral fins; forming a generally cylindrical longitudinally extending aperture of varying diameter in the interior of said blank, said aperture opening into one end of the blank; forming longitudinally extending grooves of varying depth in the interior of said blank, said grooves extending outwardly beyond said body section and into said fins; placing a mandrel of low melting point yieldable material in the aperture in said blank, the volume of the material in said mandrel being substantially that of the aperture in the finished blade; finishing the exterior of the fins to substantially the form of the leading and trailing portions of the finished propeller and the body section to a form such that when it is flattened in a direction generally normal to the planes of the fins the exterior surface thereof will form smooth plain curves connecting the exterior surfaces of the fins; flattening said body section in a direction generally normal to the planes of the fins without substantially bending the wall section thereof immediately adjacent to the solid portion of said fins and twisting the same until it is brought into the contour of the finished blade; and removing said mandrel.

5. The method of forming a hollow propeller blade for airplanes and the like which comprises: forging a blank having a root portion and an airfoil portion including a body section, said body section being substantially cylindrical and of varying transverse cross section and having on opposite sides thereof external integral fins; forming a substantially cylindrical longitudinally extending aperture of varying diameter in the interior of said blank, said aperture opening into one end of said blank; forming longitudinally extending grooves of varying depth in the interior of said blank; said grooves extending outwardly beyond said body section and into said fins; finishing the exterior of the fins to substantially the form of the leading and trailing portions of the finished propeller and the substantially cylindrical body section to a form such that when it is flattened in a direction generally normal to the planes of the fins the exterior surface thereof will form smooth plain curves connecting the exterior surfaces of the fins; positioning a mandrel of low melting point yieldable material in the aperture in said blank, the volume of the material in said mandrel being substantially that of the aperture in the finished blade; flattening said substantially cylindrical body section in a direction generally normal to the planes of the fins without substantially bending the wall section thereof immediately adjacent to the solid portion of said fins until the exterior surface thereof forms smooth plain curves with the exterior surfaces of the fins; heating said blank to remove said mandrel; and twisting the airfoil portion to bring it into the shape of the finished blade.

6. The method of forming a hollow propeller blade for airplanes and the like which comprises: forging a blank having a root portion and an airfoil body portion including a body section, said section being substantially cylindrical and of varying transverse cross section and having on opposite sides thereof external integral fins; machining the interior of said blank to form a longitudinally extending substantially cylindrical aperture of varying diameter and opening into one end; machining longitudinal grooves of varying depth in the interior of said blank, said grooves extending outwardly beyond said body section and into said fins; positioning a mandrel of low melting point yieldable material in the aperture in said blank, the volume of material in said mandrel being substantially that of the aperture in the finished blade; finishing the exterior of the fins to substantially the form of the leading and trailing portions of the finished propeller and the substantially cylindrical body section to a form such that when it is flattened in a direction generally normal to the planes of said fins the exterior surface thereof will form smooth plain curves connecting the exterior surfaces of the fins; flattening said substantially cylindrical body section in a direction generally normal to the planes of the fins without substantially bending the wall section thereof immediately adjacent to the solid portion of said fins until the exterior surface thereof forms smooth plain curves with the exterior surfaces of the fins; heating said blank to remove said mandrel; and twisting the airfoil portion to bring it into the shape of the finished blade.

7. The method of forming a hollow propeller blade for airplanes and the like which comprises forming a blank with a body of varying transverse cross-section to provide the airfoil section of a propeller blade and having longitudinally extending fins on opposite sides thereof of substantially the outside shape in transverse cross-section of and adapted to form the leading and trailing edges of the airfoil section of the propeller blade, forming for substantially the entire length of said body an internal longitudinal recess extending outwardly beyond the body proper into said fins to provide grooves extending outwardly beyond the body proper and into said fins, said fins being substantially the same in transverse cross-section as that of the leading and trailing portions of the airfoil section of the propeller blade and connected together by portions semi-circular in transverse cross-section and of a thickness substantially that of the front and rear walls of the airfoil section of the propeller blade and providing substantially alike both internal and external reverse curves with said fins, and subsequently flattening said body into smooth airfoil surfaces with said fins and maintaining the fins and the grooves therein substantially unchanged in transverse cross-section to remove said curves and produce maximum bending in the wall section where the fins join the body proper.

8. The method of forming a hollow propeller blade for airplanes and the like which comprises forming a blank with a body of varying transverse cross-section to provide the airfoil section of a propeller blade and having longitudinally extending fins on opposite sides thereof of substantially the outside shape in transverse cross-section of and adapted to form the leading and trailing edges of the airfoil section of the propeller blade, forming for substantially the entire length of said body an internal longitudinal recess extending outwardly beyond the body proper into said fins to provide grooves extending outwardly beyond the body proper and into said fins, said fins being substantially the same in transverse cross-section as that of the leading and trailing portions of the airfoil section of the propeller blade and connected together by portions semi-circular in transverse cross-section and of a thickness substantially that of the front and rear walls of the airfoil section of the propeller blade and providing substantially alike both internal and external reverse curves with said fins, placing a mandrel of low melting point yieldable material in said aperture the volume of the material of which mandrel is substantially that of the aperture in the finished propeller blade, subsequently flattening said body into smooth airfoil surfaces with said fins and maintaining the fins and the grooves therein substantially unchanged in transverse cross-section to remove said curves and produce maximum bending in the wall section where the fins join the body proper, and heating said blank to remove said mandrel.

ANDREW A. ANDRAKE.